United States Patent [19]

Kokubo et al.

[11] Patent Number: 5,097,488
[45] Date of Patent: Mar. 17, 1992

[54] TRANSMISSION APPARATUS AND METHOD

[75] Inventors: Masaru Kokubo, Fuchu; Haruo Kamimaki, Hachioji; Hirotaka Hara, Kodaira; Toshiro Suzuki, Tama; Motohiro Kokumai, Yokohama, all of Japan

[73] Assignee: Hitachi, Ltd., Tokyo, Japan

[21] Appl. No.: 614,498

[22] Filed: Nov. 16, 1990

[30] Foreign Application Priority Data

Nov. 22, 1989 [JP] Japan .................. 1-302121

[51] Int. Cl.$^5$ .............................. H04L 7/04
[52] U.S. Cl. ..................... 375/106; 375/111; 370/32.1; 329/361
[58] Field of Search ........... 375/14, 106, 108, 111; 329/361; 370/32, 32.1

[56] References Cited

U.S. PATENT DOCUMENTS

| 4,461,999 | 7/1984 | Wolf et al. | 375/111 |
| 4,530,104 | 7/1985 | Kamerman | 375/14 |
| 4,672,447 | 6/1987 | Moring et al. | 375/111 |
| 4,959,845 | 9/1990 | Tol et al. | 375/108 |

Primary Examiner—Benedict V. Safourek
Assistant Examiner—Young Tse
Attorney, Agent, or Firm—Antonelli, Terry, Stout & Kraus

[57] ABSTRACT

A signal processing method and system in a receiving apparatus including a receiving equalizer circuit are provided for extracting transmission data from a received signal inputted via a transmission path every transmission frame having a predetermined synchronization pattern and transmission data. A phase error is detected from the received signal extracted in synchronism with a sampling signal in the receiving equalizer circuit. The frequency of the sampling signal is controlled until the phase error becomes minimum. In parallel, it is detected whether the frame synchronization pattern is present in the received signal in a predetermined interval or not. When the presence of the frame synchronization pattern is not detected after the phase has been stabilized by frequency control of the sampling signal, the sampling phase of the received signal is judged to be in the quasi-convergence state. Then the frequency of the sampling signal is forcibly changed largely. The frequency control of the sampling signal and detection of the frame synchronization pattern are repeated.

16 Claims, 12 Drawing Sheets

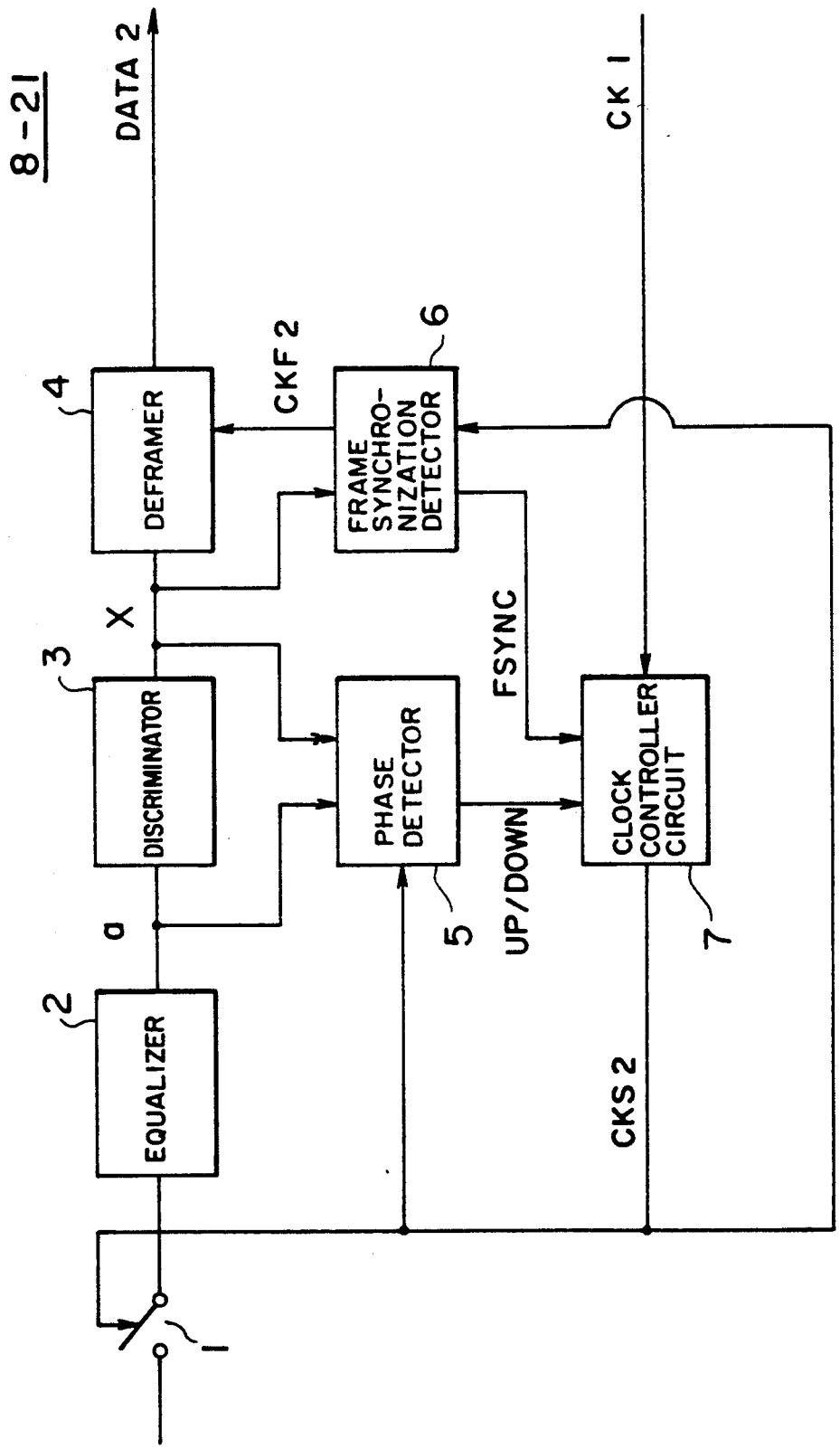

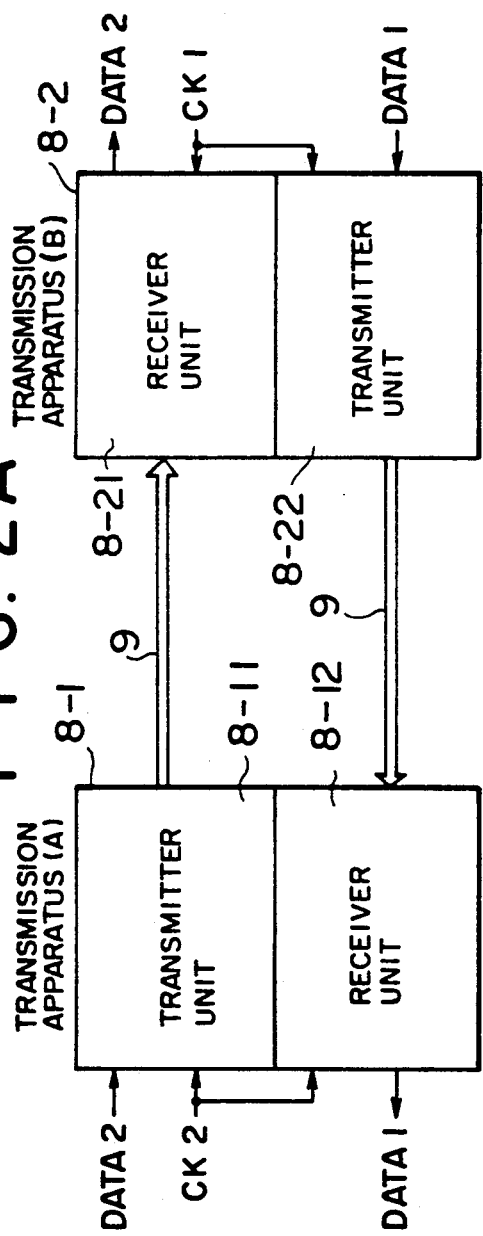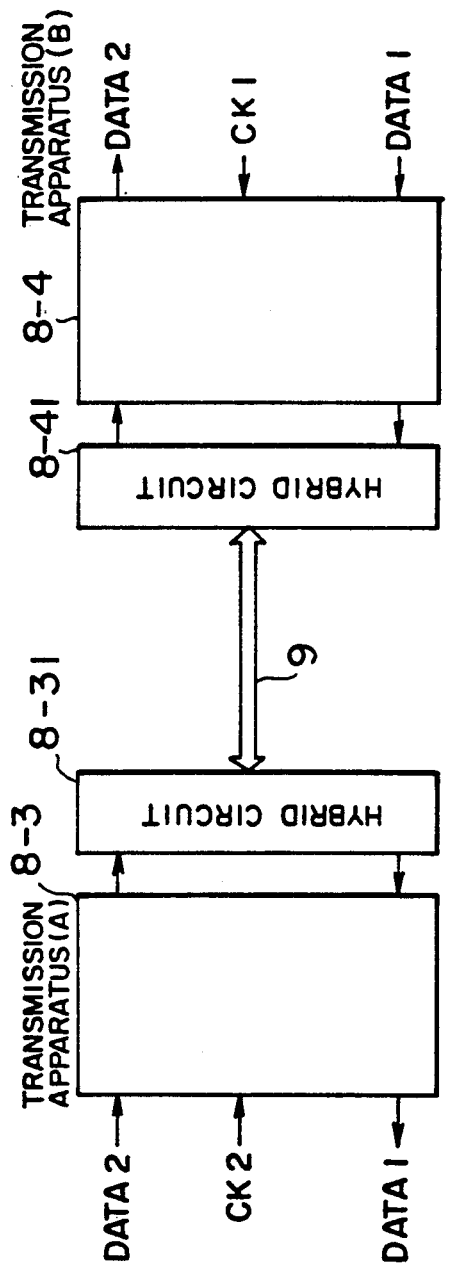

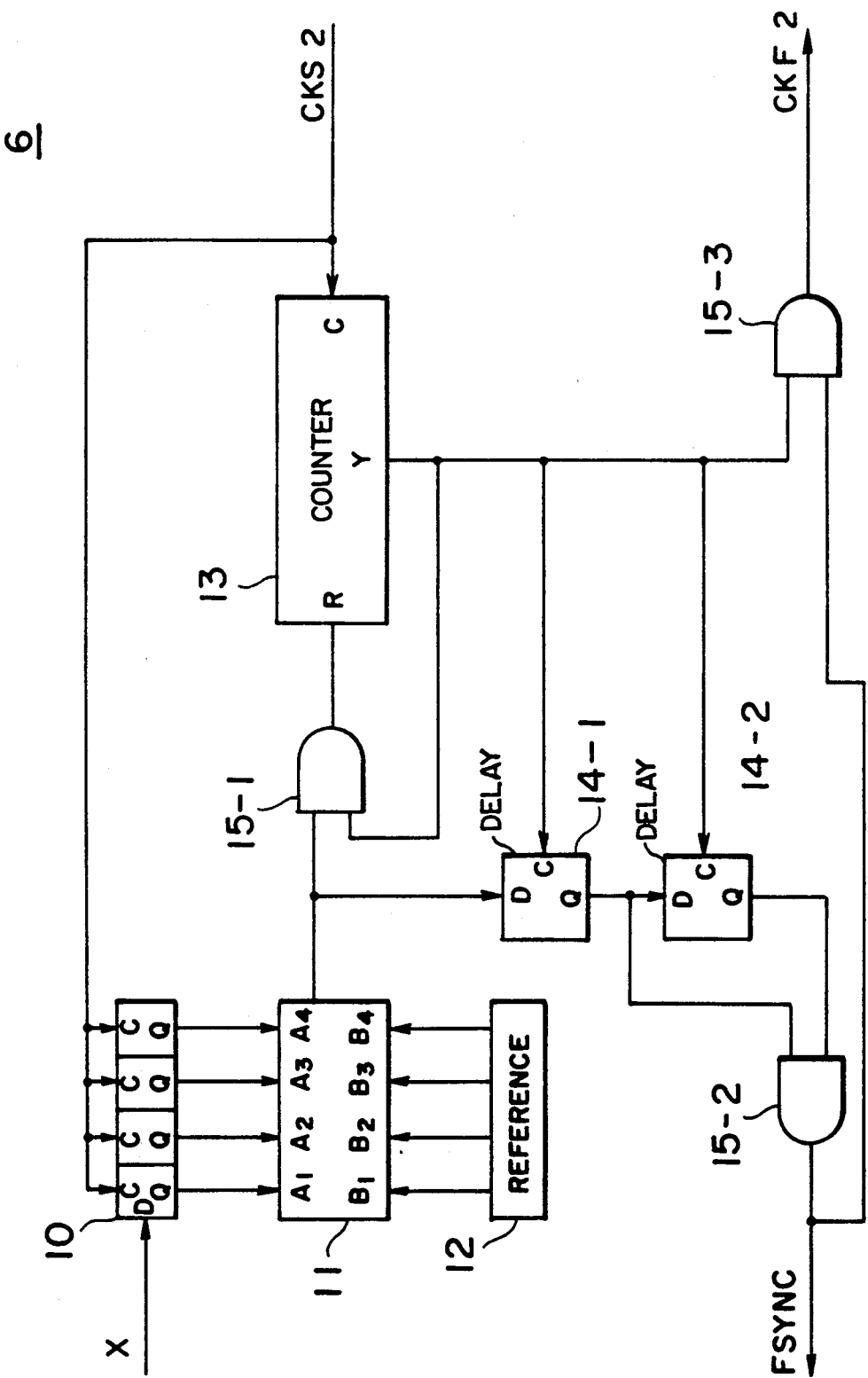

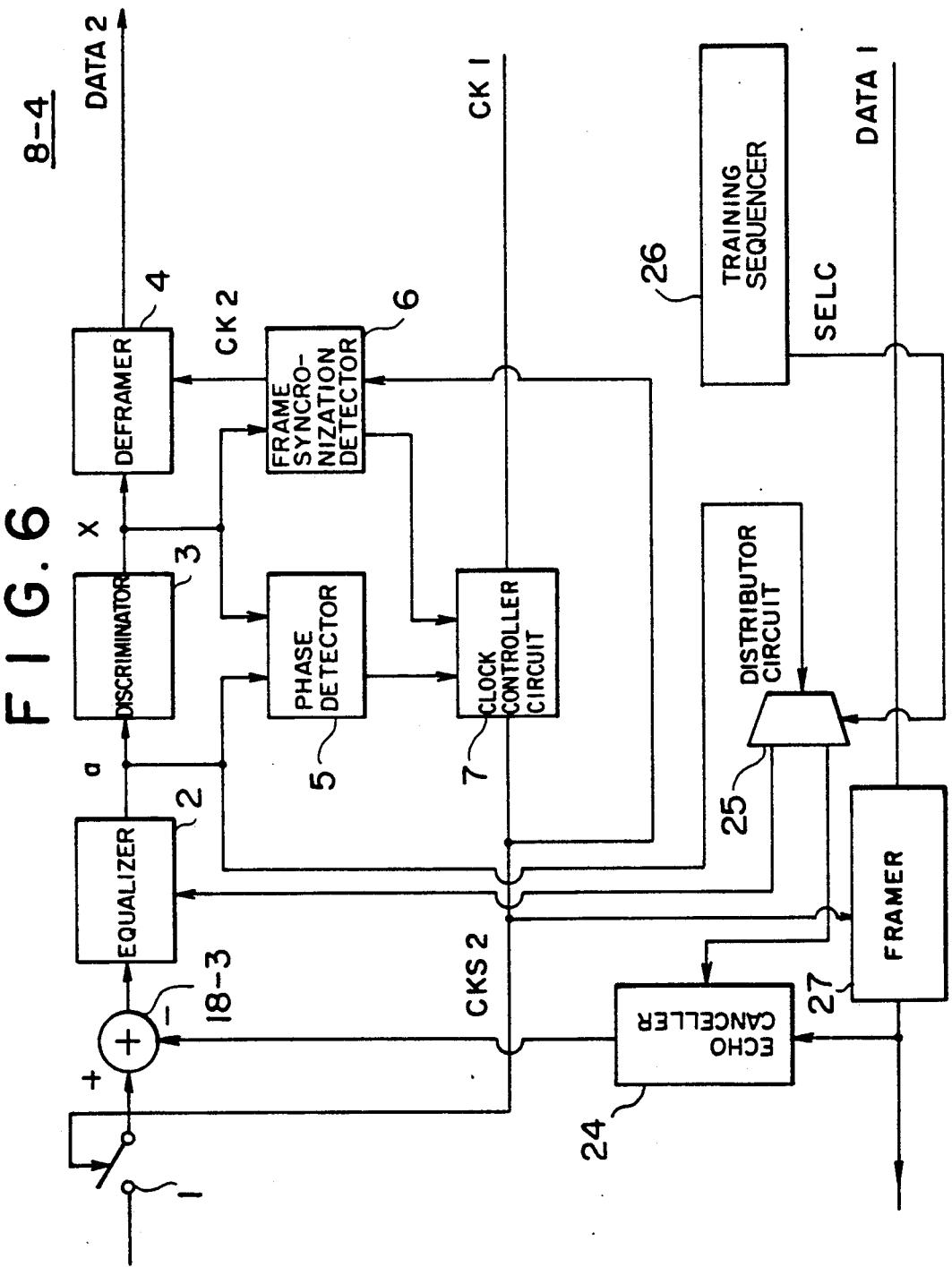

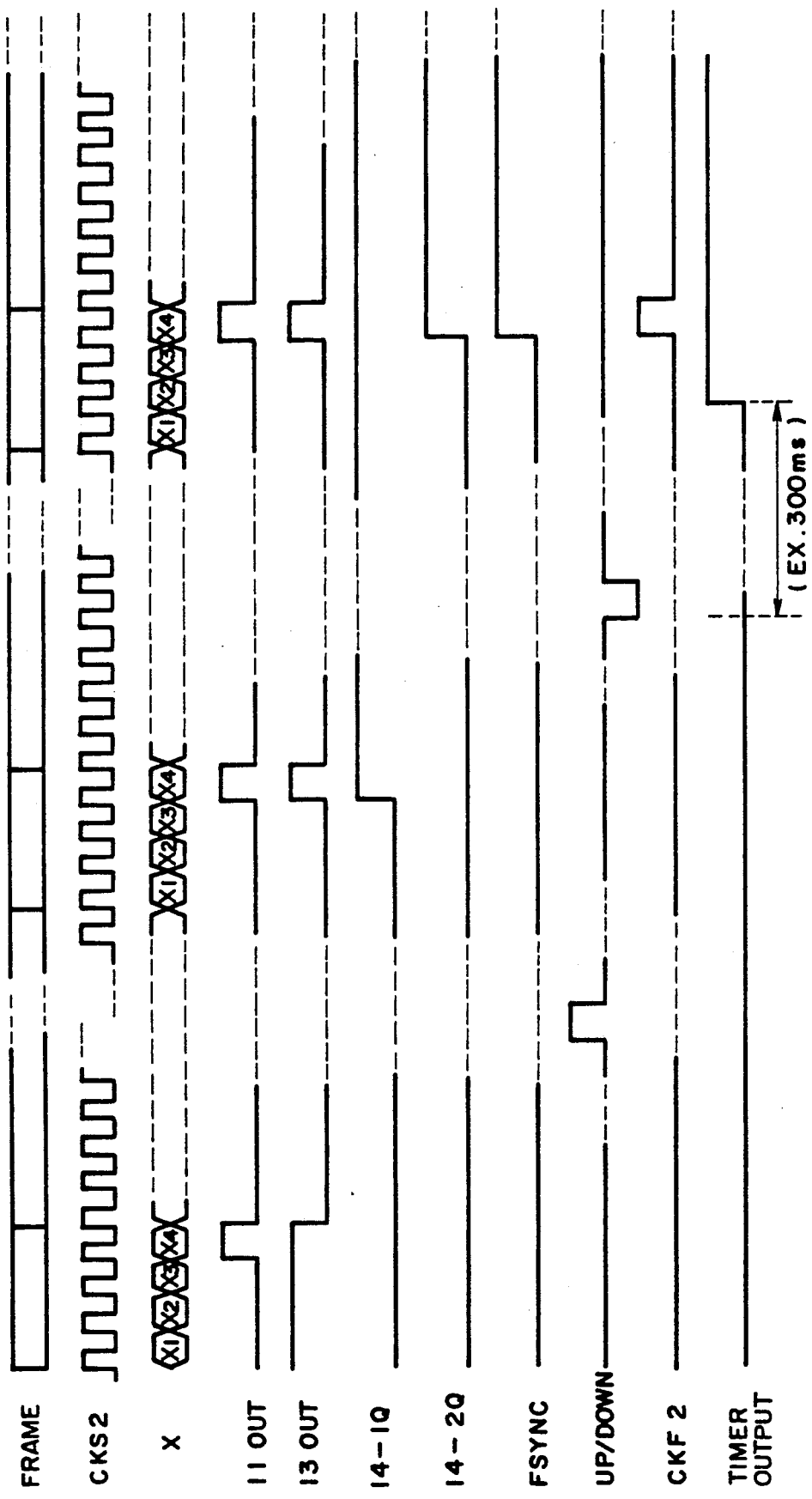

TRANSMISSION APPARATUS AND METHOD

BACKGROUND OF THE INVENTION

The present invention relates to a signal transmission technique, and in particular to a transmission method and a transmission apparatus responsive to the phase error for controlling the receiving sample timing of a signal which does not include a special signal or signal train for phase detection.

In a conventional apparatus, intersymbol interference of a received signal is first eliminated to sample the received signal and phase detection is performed by using a special signal train (training pattern) included in the received signal as described in National Telecommunications Conference, E1.5.1-6, Nov. 1981.

In general, structures of signal frames in a transmission path are restricted by standards of respective nations. Particularly standard specifications (ANSI standards) of the USA forbids a transmission frame to include a special signal train for phase detection. As reported by Hayashi etc. in Technical Report CS88-38, pp. 13-18, The Institute of Electronics, Information and Communication Engineers (IEICE), Japan, July 1988, therefore, residual intersymbol interference due to a receiver causes a phenomenon described below. That is to say, the phase detector has a plurality of convergence points and the phases at which the received signal is sampled converges into a quasi-stable point. Once quasi-convergence has occurred, it is impossible to escape from the receiving phase. This results in a problem of increase of initial convergence or a problem of failure in convergence caused by nonconvergence.

SUMMARY OF THE INVENTION

An object of the present invention is to provide a method and apparatus for processing a received signal in a transmission apparatus allowing detection of the quasi-convergence state of phase of a received signal and escape from the quasi-stable point by using forced phase control.

Another object of the present invention is to provide a signal sampling method, and apparatus capable of shortening the initial convergence time and eliminating nonconvergence in processing for extracting transmitted data from the received signal.

In order to achieve the above described object, a transmission apparatus according to a feature of the present invention comprises means for judging whether phases at which the received signal is sampled have converged into the correct convergence point or not and means responsive to quasi-convergence for forcibly controlling the phase at which the received signal is sampled. The function of determining that the sampling phase of the received signal is a correct phase is attained by discriminating a code train periodically received such as a frame synchronization pattern. In a typical transmission apparatus such as a U interface of an ISDN (integrated services of digital network), a 9-symbol pattern (−3, −3, +3, +3, +3, −3, +3, −3, −3) is used as the frame synchronization pattern, where +3 and −3 represent amplitude values in the 2B1Q code. Therefore, it is considered that convergence to the correct phase has been attained when two conditions comprising the condition that the phase has been stabilized, i.e., the output of the phase detector has become O and the condition that the above described frame synchronization pattern has been discriminated are satisfied. On the other hand, it is considered that quasi-convergence has occurred in case the frame synchronization pattern cannot be discriminated even if the phase is stable.

Further, as the method for forcibly controlling the sample phase of a received signal in case quasi-convergence has been detected, the method of switching a frequency division ratio control input of a variable frequency divider can be used.

In a transmission apparatus according to a feature of the present invention, the phase error of a received signal and the result of detection of the frame synchronization pattern are used in order to judge whether phases at which the received signal is sampled have converged into a correct convergence point or not. Therefore, the case where the frame synchronization pattern cannot be detected even if the phase is stable can be regarded as the quasi-convergence state. Further, if quasi-convergence is judged to be present, forced control for largely changing the sample phase is exercised. As a result, control can be repeated automatically until escape from quasi-convergence and correct convergence are performed.

BRIEF DESCRIPTION OF THE DRAWINGS

FIG. 1 is a block configuration diagram of a transmission apparatus;

FIGS. 2A and 2B are block diagrams showing different examples of connection of the transmission apparatus;

FIG. 3 is a configuration diagram of a frame synchronization detection circuit;

FIG. 6 is a block diagram showing an example of configuration of a transmission apparatus including an echo canceller;

FIG. 8 is a timing diagram for explaining the operation of respective constituent devices of a transmission apparatus;

DESCRIPTION OF THE PREFERRED EMBODIMENTS

Figure 4:
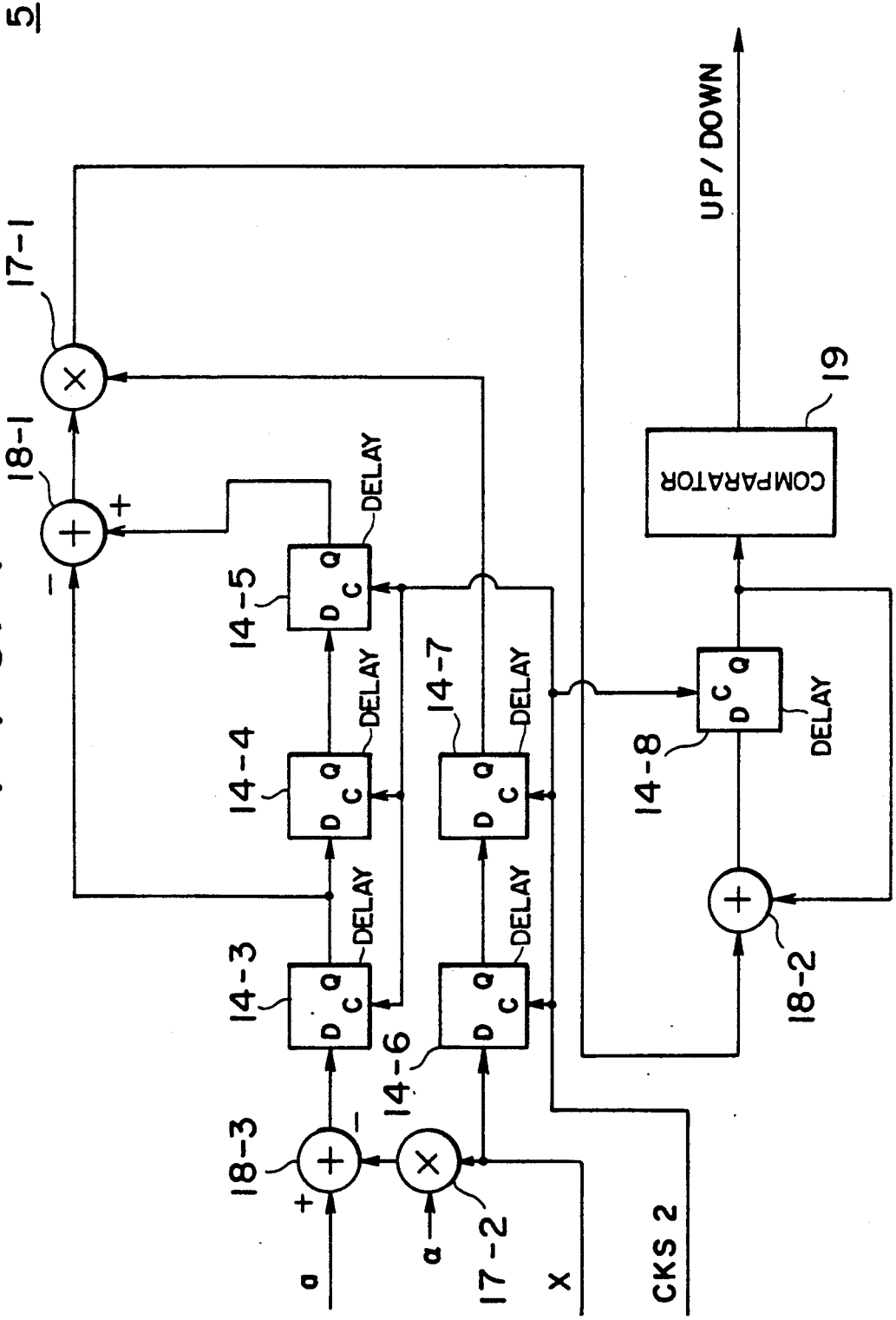
FIG. 4 is a circuit diagram showing an example of configuration of a phase detection circuit.

An embodiment of the present invention will hereafter be described by referring to FIGS. 1 to 5.

First of all, FIGS. 2A and 2B show connection of a transmission apparatus. A transmission apparatus (A) 8-1 or 8-3 is connected to a transmission apparatus (B) 8-2 or 8-4 via one pair or two pairs of cables 9. In case one pair of cables is used, it is necessary to provide an echo canceller within the transmission apparatus. The embodiment of the transmission apparatus shown in FIG. 2B will be described later by referring to FIG. 6.

Signal transmission from the transmission apparatus (A) 8-1 to the transmission apparatus (B) 8-2 is performed as hereafter described.

A transmission section 8-11 of the transmission apparatus (A) 8-1 converts data DATA2 to be transmitted into multi-level codes 2B1Q or 4B3T and transmits the resultant codes to the pair cable 9 at a timing synchronized to clock CK2. A receiver unit 8-21 of the transmission apparatus (B) 8-2, or especially an equalizer included therein removes intersymbol interference generated by frequency characteristics of the pair cable 9. After the code discrimination and decision of the sampling phase of the received signal, the receiver unit 8-21 reproduces the received data DATA2.

In the same way, signal transmission from a transmitter unit 8-22 of the transmission apparatus (B) 8-2 to a receiver unit 8-12 of the transmission apparatus (A) 8-1 is performed as heretofore described.

In synchronism with a clock CKS2 extracted from the above described received waveform, the transmission apparatus (B) 8-2 converts data DATA1 to be transmitted into the code 2B1Q or 4B3T and transmits the resultant code to the pair cable 9. In the same way as the transmission apparatus 8-2, the transmission apparatus (A) 8-1 also removes intersymbol interference generated by frequency characteristics of the pair cable 9 with respect to the signal received by the transmission apparatus (A) 8-1. After the code discrimination and decision of the sampling phase of the received signal, the transmission apparatus 8-2 reproduces the received data DATA1.

FIG. 1 shows the configuration of the receiving equalizer circuit 8-21 of the transmission apparatus (B) 8-2. With reference to FIG. 1, the receiving equalizer circuit 8-21 comprises a sample switch 1 opened and closed by the clock CKS2, an equalizer 2 for applying waveform equalization to a received signal, a discriminator 3 for applying code discrimination to output a of the equalizer 2, a deframer 4 for taking out digital data from a discriminated code X on the basis of a predetermined frame structure, a phase detector 5 responsive to the output a of the equalizer 2 and the output X of the discriminator 3 for detecting the phase difference between the optimum phase for sampling the received signal and the current phase, a frame synchronization detector circuit 6 for detecting a frame synchronization pattern out of the output X of the discriminator 3, and a clock controller circuit 7 responsive to output UP/-DOWN of the phase detector 5 for controlling the phase of the sample clock CKS2 used to open and close the sampling switch 1.

The received signal is sampled by the sample switch 1 every transmission interval (clock CKS2). The received signal thus sampled is compensated in gain and delay by the equalizer so designed as to give frequency characteristics, which cancel the frequency characteristics possessed by the pair cable 9 itself, to the input signal thereof. The intersymbol interference component is thus removed.

The received signal with intersymbol interference removed undergoes in the discriminator 3 conversion from a line code such as 2B1Q or 4B3T to a binary signal. The discriminator 3 comprises a plurality of comparators respectively having predetermined thresholds. In case the 2B1Q code is to be discriminated, for example, three thresholds are provided. In case the 4B3T code is to be discriminated, two thresholds are provided.

In the deframer 4, the output X of the discriminator 3 is divided into the frame synchronization pattern and received data in accordance with the predetermined frame structure. The deframer 4 can recognize the position of the frame synchronization pattern on the basis of a frame synchronization pattern position signal CKF2 outputted from the frame synchronization detector circuit 6.

The frame synchronization detector circuit 6 judges whether the output X of the discriminator 3 coincides with the predetermined frame synchronization pattern (2B1Q code or 4B3T code converted into a binary code) or not and outputs a frame synchronization signal FSYNC and the frame synchronization pattern position signal CKF2.

Figure 7A:
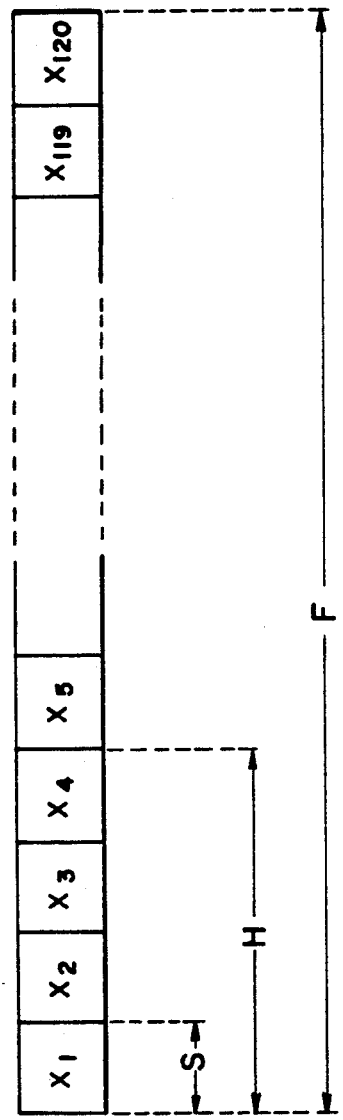
FIGS. 7A and 7B are configuration diagrams of a transmission frame.
Figure 7B:
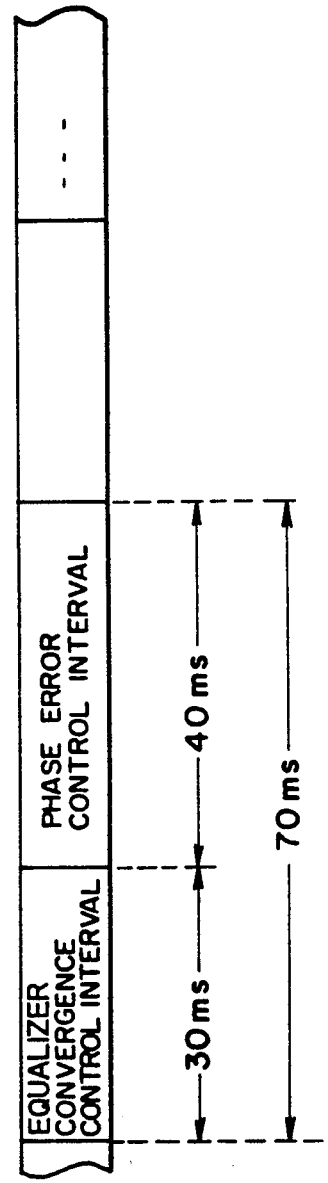

FIGS. 7A and 7B show configuration diagrams of a frame transmitted onto the transmission path 9.

Data are encoded every sample period (such as 12.5 $\mu$sec, for example). Encoded data corresponding to 120 samples constitute one frame. In this case, one frame length is defined as 1.5 msec, and 4 bits (4 samples $\times$ 12.5 $\mu$sec) located at the beginning of a frame are defined as frame head length H, i.e., frame synchronization pattern. Encoded data are stored into 116 remaining bits.

Unless intersymbol interference is caused, code discrimination of a signal frame having such configuration can be performed at the receiving side with the same sample period (12.5 $\mu$sec).

In general, however, intersymbol interference is caused more or less although it depends upon characteristics of the transmission path. In the transceiver, the sample period changes more or less depending upon the external environment (such as temperature and humidity). As described below, therefore, it is necessary to exercise phase control by using the received signal.

Function and operation of each constituent circuit of the receiving equalizer circuit 8-21 will hereafter be described.

FIG. 3 shows an embodiment of configuration of the frame synchronization detector circuit 6. It is assumed in this example that the length of the frame synchronization pattern is equivalent to the length (50 $\mu$s) of four samples. The frame synchronization detector circuit 6 comprises a shift register 10, a coincidence circuit 11 responsive to coincidence between inputs $A_1$-$A_4$ and inputs $B_1$-$B_4$ for yielding the output "1", a reference ROM 12 for storing a frame synchronization pattern (data) determined by standards, a counter 13 for counting frame periods every sample clock CKS2 and yielding "1" on output Y thereof in response to predetermined count, an AND logical element 15-1 for inhibiting the output of the coincidence circuit 11 from resetting the counter 13 during the count operation of the counter 13, delay elements 14-1 and 14-2 for delaying the output of the coincidence circuit 11 by one frame period, an AND logical element 15-2 for generating the logical product of outputs of the delay elements 14-1 and 14-2, and an AND logical element 15-3 for inhibiting output of the frame synchronization pattern position signal CKF2 by using the output of the AND logic element 15-2. It is now assumed for the purpose of exemplification that the frame synchronization pattern comprises 4 symbols. According to standards, however, the frame synchronization pattern may comprise 9 symbols, for example. In that case, the symbol configuration shown in FIGS. 7A and 8 is so modified that the frame synchronization pattern may comprise 9 symbols.

Operation timing of each constituent device within the frame synchronization detector circuit will now be described by referring to a time chart shown in FIG. 8.

The output X of the discriminator 3 is inputted to the shift register 10 and shifted every interval of the sample clock CKS2. If the equalizer 2 converges correctly, a pattern equivalent to the frame synchronization pattern is detected from the output of the discriminator 3 at a rate of once per frame. At that time, the output X coincides with the predetermined code train stored in the ROM 12, and the output (11 out) of the coincidence circuit 11 becomes "1". The counter 13 counts frame intervals. If the frame interval coincides with detection of frame synchronization pattern, therefore, the output Q of the delay unit 14-1 becomes "1". When the equalizer 2 and the sample clock CKS2 are not in the state of convergence, the discriminator 3 cannot perform correct code discrimination. Therefore, frame synchronization pattern cannot be detected every predetermined frame interval, and the output Q of the delay element 14-1 remains "0". In the same way, the output Q of the delay element 14-2 also becomes "1" only when the frame interval coincides with the frame synchronization pattern detection interval.

The frame synchronization signal FSYNC becomes "1" when two inputs of the AND logical element 15-2 become "1", i.e., Q outputs of both the delay element 14-1 and the delay element 14-2 become "1". For the brevity of description, the frame synchronization signal FSYNC is not set at "1" in this example until the frame synchronization pattern can be detected twice in succession. However, the number of stages is not limited to this. Even if protection is performed with an arbitrary number of stages, there is no problem. Further, the delay elements 14-1 and 14-2 are not indispensable to the configuration. In alternative configuration, outputs of the coincidence circuit 11 are counted with a predetermined period, and the FSYNC is outputted according to the count.

The frame synchronization pattern position signal CKF2 is outputted from the AND logical element 15-3 as the logical product of the output Y of the counter 13 and the frame synchronization signal FSYNC.

The counter 13 is reset by the AND logical element 15-1 yielding the logical product of the output of the coincidence circuit 11 and the output Y of the counter 13. When the coincidence circuit 11 has detected the frame synchronization pattern, therefore, the count of the counter 13 becomes "0". The counter 13 then counts pulses of the sample clock CKS2. When the counter 13 has counted, say, 120 samples during one frame, "1" is outputted on the output (13 out).

The sample clock CKS2 is controlled by the phase detector circuit 5 and the clock controller circuit 7.

On the basis of the output a of the equalizer 2 and the output X of the discriminator 3, the phase detector circuit 5 derives the phase difference between the phase of the current sample clock and the optimum sample phase of the received waveform. In response to the output UP/DOWN of the phase detector circuit 5, the clock controller circuit 7 changes the frequency division ratio of a system clock CK1 and thus controls the phase relation between the system clock CK1 and the sample clock CKS2.

FIG. 4 shows an embodiment of the phase detector circuit 5.

The phase detector circuit 5 comprises a multiplier 17-2 for multiplying the output X of the discriminator 3 by a value $\alpha$ obtained by normalizing the output a of the equalizer 2, an adder 18-3 for subtracting the output of the above described multiplier 17-2 from the output a of the equalizer 2, delay elements 14-3, 14-4 and 14-5 supplied with the output of the above described adder 18-3 as the input and coupled to form a shift register having contents shifted by the sample clock CKS2, delay elements 14-6 and 14-7 supplied with the output X of the discriminator 3 as the input and coupled to form a shift register having contents shifted by the sample clock CKS2, an adder 18-1 for deriving the difference between the output Q of the above described delay element 14-3 and the output Q of the above described delay element 14-5, a multiplier 17-1 for multiplying the output of the above described adder 18-1 by the output Q of the above described delay element 14-7, an adder 18-2 for adding the output of the above described multiplier 17-1 and the output Q of the delay element 14-8, a delay element 14-8 supplied with the output of the above described adder 18-2 as the input, and a comparator 19 so supplied with the output Q of the above described delay element 14-8 as the input as to output one of three values $+1$, 0 and $-1$ clock control signal UP/DOWN on the basis of predetermined thresholds.

First of all, intersymbol interference at each sample point is derived by subtracting in the adder 18-3 a numerical value, which is obtained by multiplying the output X of the discriminator 3 by the normalized value c in the multiplier 17-2, from the output a of the equalizer 2 in the adder 18-3.

Therefore, the amount of intersymbol interference is inputted to the shift register comprising the delay elements 14-3, 14-4 and 14-5. On the other hand, the output X of the discriminator 3 is inputted to the shift register comprising the delay elements 14-6 and 14-7. In the adder 18-1 and the multiplier 17-1, phase difference $\Delta\phi$ between the phase at a sample point and the phase at the optimum sample point is calculated. Phase difference $\Delta\phi$: at sample: is represented as $$\Delta\phi_i = X_i(p_1 - p_2)$$

where $p_1 = a_{i+1} - \alpha X_{i+1}$, $p_2 = a_{i-1} - \alpha X_{i-1}$, $a_i$ and $X_i$ are respectively the output of an i-th equalizer 2 and the output of the discriminator 3, and $\alpha$ is the value of standards with respect to the output of the equalizer 2.

In addition to the phase difference $\Delta\phi$, the output of the multiplier 17-1 contains an error caused by imperfection of the equalizer 2 and power related noise and impulse noise mixed into the pair cable. These are removed by an integrator comprising the adder 18-2 and the delay element 14-8. Only the component of phase difference $\Delta\phi$ is outputted.

On the basis of the above described phase difference $\Delta\phi$, the comparator 19 outputs the control signal UP/DOWN to specify one of three alternatives, i.e., control of the sample clock phase in the advance direction, control of the sample clock phase in the delay direction, and phase holding. The threshold used for comparison is not specifically specified, but it is determined by the amount of jitter allowed to the reproduced clock. It is now assumed for the purpose of exemplification that a value which is four times the value $\alpha$ of standards with respect to the output of the equalizer 2 is used. As the control signal UP/DOWN, therefore, the comparator 19 outputs "+1" when the input exceeds $4\alpha$, outputs "−1" when the input is less than $-4\alpha$, and outputs "0" when the input is in the range of $-4\alpha$ to $+4\alpha$.

Figure 9:
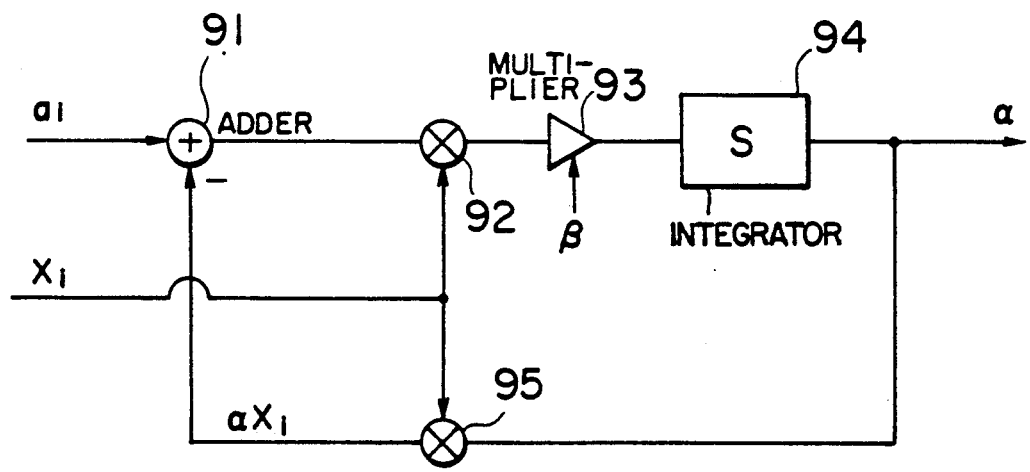
FIG. 9 is a circuit diagram showing the configuration of a standard value generator circuit.

If a suitable numerical value is known beforehand, the above described value $\alpha$ of standards may be given as a constant. Alternatively, the value may be dynamically generated according to the received signal by connecting a standards value generator circuit as shown in FIG. 9 in parallel to the discriminator 3.

The standards value generator circuit is supplied with the output $a_i$ of the equalizer 2 and the output $X_i$ of the discriminator 3 as inputs thereof. In an adder 91, $\alpha X_i$ is subtracted from $a_i$. The result of subtraction $(a_i - \alpha X_i)$ corresponds to the amount of intersymbol interference. In a multiplier 92, the amount of intersymbol interference $(a_i - \alpha X_i)$ is then multiplied by $X_i$. The result is multiplied by a predetermined weight coefficient $\beta$. The resultant product is integrated in an integrator 94. The result of integration is outputted as the value $\alpha$ of standards.

Further, the above described sample clock CKS2 is obtained by a well-known method whereby the system clock CK1 undergoes frequency division with an arbitrary frequency division ratio.

Figure 5:
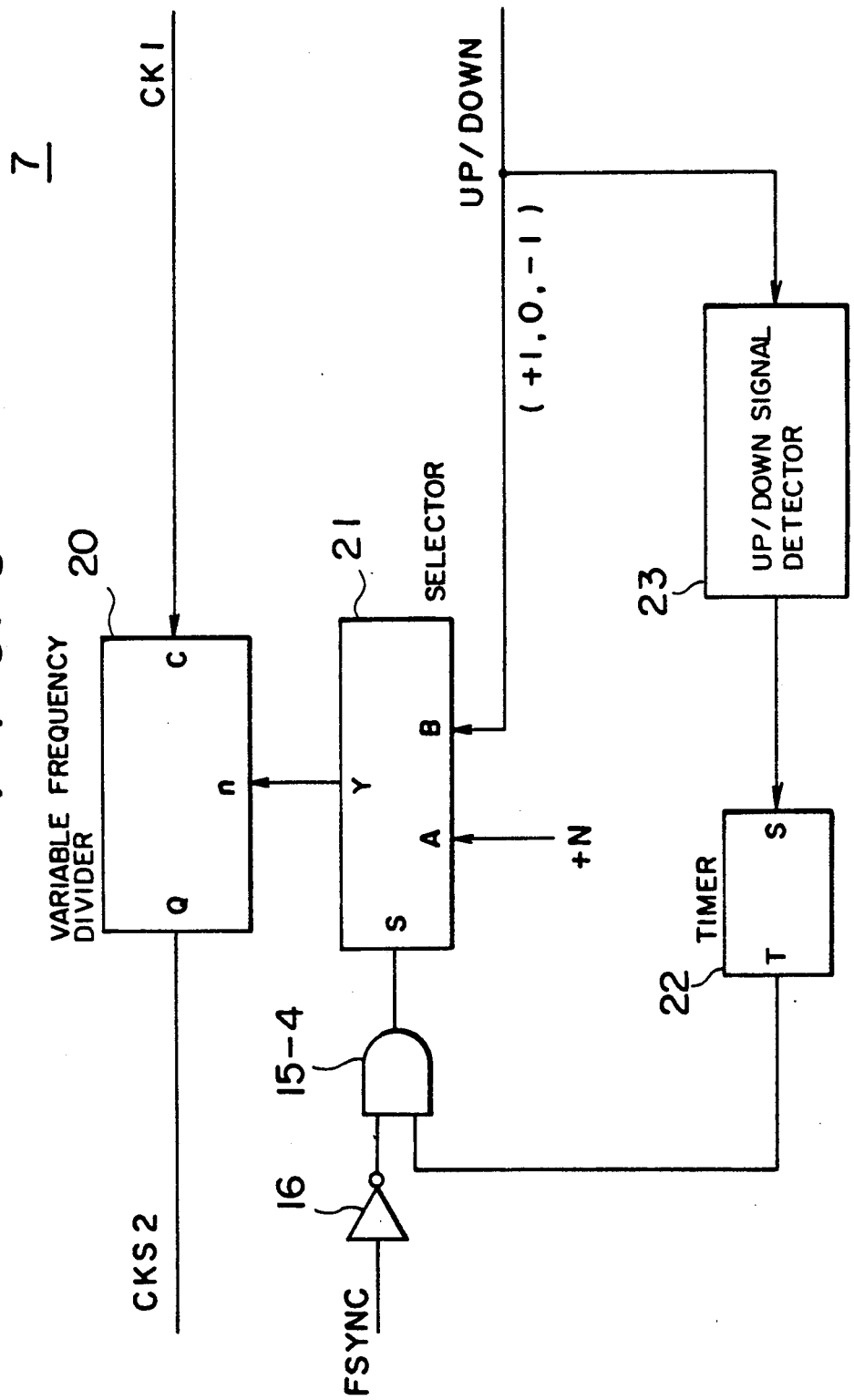
FIG. 5 is a schematic circuit diagram showing an example of configuration of a clock controller circuit.

FIG. 5 shows an embodiment of the clock controller circuit 7.

The clock controller circuit 7 comprises a variable frequency divider 20 for applying frequency division to the system clock CK1 with an arbitrary frequency division ratio $M \pm 1$ or $M \pm N$, a selector 21 for selecting input B when the input S is 0, a detector 23 for detecting whether the value of the control signal UP/DOWN inputted thereto is +1 or −1, a timer 22 adapted to be reset by the output of the detector 23, a NOT logical element 16 for yielding logical negation of the frame synchronization signal FSYNC, and an AND logical element 15-4 for yielding the logical product of the output of the timer 22 and the output of the NOT logic element 16.

Operation of the clock controller circuit will hereafter be described.

When the frame synchronization signal FSYNC is "1", i.e., when the frame synchronization is established and duplex data transmission is performed, the output of the AND logical element 15-4 becomes "0". Therefore, the selector 21 outputs the control signal UP/DOWN supplied to its input B to its output Y. Assuming that the frequency division ratio of the variable frequency divider 20 is M when n=0, the frequency division ratio becomes M+1 when n=+1, and it becomes M−1 when n=−1. The phase of the sample clock CKS2 is controlled according to the value of the control clock UP/DOWN.

On the other hand, frame synchronization is not established yet in the initial convergence state. When the frame synchronization signal FSYNC is "0", therefore, the output of the NOT logical element 16 becomes "1" and then the AND logical element 15-4 outputs the output of the timer 22. The timer 22 is reset to the initial state by its reset input S, and its output T becomes "1" when a predetermined time has elapsed. The time preset in the timer is not specifically specified. However, the time required for phase settlement and stable detection of frame synchronization pattern is used. In this case, 300 msec (200 frame intervals) is used. The detector 23 detects that the control signal UP/DOWN is 0. As the state in which the control signal UP/DOWN becomes 0, two states can be considered. In one of the two states, convergence of phases whereat the received signal is sampled has been completed and the change disappears. In the other of the two states, quasi-convergence of the phase detector 5 occurs because convergence of the equalizer 2 is insufficient as described above. If a sufficient time elapses in the former state after the phase has stabilized, correct discrimination is performed and the frame synchronization pattern detection becomes possible. Even if control using the phase control signal UP/DOWN is removed in the latter case, discrimination is not performed correctly because the received signal is sampled at a wrong phase. Therefore, detection of the frame synchronization pattern is also impossible.

When the control signal UP/DOWN is continuously in the state 0, the output of the detector 23 remains "0". At this time, the timer 22 is not reset. When 300 msec has elapsed since the last detection of +1 or −1 by the detector 23, therefore, the output of the timer 22 becomes "1". If the output of the timer 22 becomes "1", the output of the AND logical element 15-4 also becomes "1". Therefore, the input A of the selector 21 is selected as the output Y of the selector 21. The output Y of the selector 21 thus becomes N. Since the input n of the variable frequency divider 20 becomes N, the frequency division ratio becomes M+N. Therefore, the phase of the sample clock CKS1 largely changes. The value of N used here is not especially limited, but depends upon the amount of phase change required for escape from the quasi-stable point of phase. In this example, however, "4" is used. Since the direction into which the phase is forcibly changed is not especially limited, control of phase into the advance direction (i.e., N=−4) poses no problem.

Figure 10:
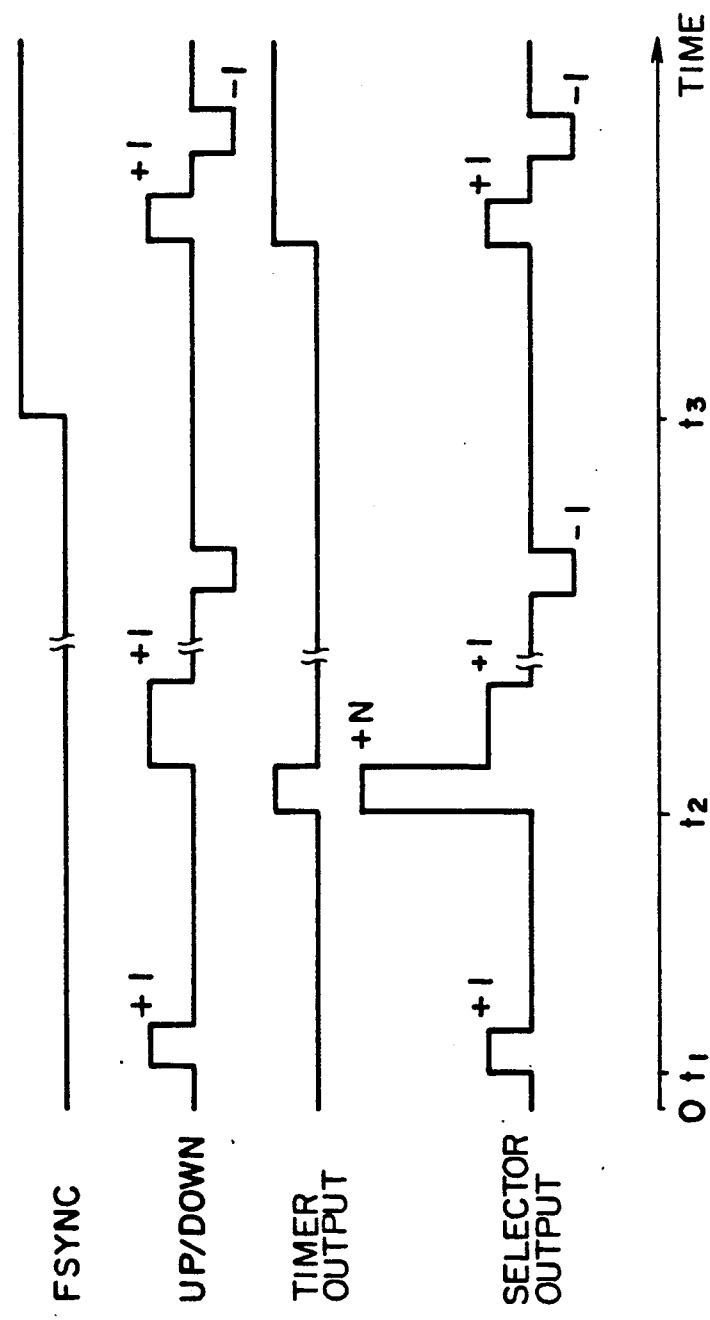
FIG. 10 is a timing diagram for explaining the operation of the controller circuit.

Operation of the above described clock controller circuit ranging from the beginning of operation to the completion of phase control will now be described in association with the concrete output signal by referring to FIG. 10.

When synchronization is not established yet (i.e., FSYNC=0), the UP/DOWN signal supplied from the phase detector 5 is outputted as the output Y of the selector 21. If the UP/DOWN output is +1 at time $t_1$, therefore, the variable frequency divider 20 applies frequency division to CK1 with a frequency division ratio of M+1. Assuming that CK1=5.12 MHz, for example, the reference frequency division ratio becomes M=64. As a result of control at time $t_1$, the frequency division ratio becomes 65.

If the UP/DOWN signal is not outputted thereafter from the phase detector 5 because phases converge to a quasi-stable point, for example, the timer 22 yields its output at time $t_2$ ($t_1 - t_2$: 300 msec). As a result, +N (=4) is outputted as the output of the selector 21. Since the frequency division ratio becomes M+N (=68), substantial phase control is conducted again. As a result of phase control, phases converge thereafter. If frame synchronization is established during that time, "1" is outputted from the frame synchronization detector circuit 6 as the FSYNC signal (time $t_3$) While this FSYNC signal is "1", i.e., while the frame synchronization pattern is continuously detected, forced control (making the frequency division ratio equivalent to M+N) is forbidden. Even if the output T of the timer becomes "1", the phase is responsive to only the UP/DOWN signal and undergoes fine adjustment.

FIG. 6 shows the configuration of the transmission apparatus 8-4 used when one pair of cables is used. When one pair of cables is used, two wire-four wire converter circuits (such as hybrid circuits 8-31 and 8-41 shown in FIG. 2B) comprising transformers and resistor elements are used. Because of impedance mismatching of the pair cable 9 with respect to the above described transformer and resistor element, however, a reflected signal component leaks into the received signal as an echo. Therefore, an echo canceller for cancelling the echo component becomes necessary.

The receiving equalizer circuit comprises a sample switch 1 opened and closed by the clock CKS2, an equalizer 2 for applying waveform equalization to a received signal, a discriminator 3 for applying code discrimination to output a of the equalizer 2, a deframer 4 for taking out digital data from a discriminated code X on the basis of a predetermined frame structure, a phase detector 5 responsive to the output a of the equalizer 2 and the output X of the discriminator 3 for detecting the phase difference between the optimum phase for sampling the received signal and the current phase, a frame synchronization detector circuit 6 for detecting a frame synchronization pattern out of the output X of the discriminator 3, a clock controller circuit 7 responsive to output UP/DOWN of the phase detector 5 for controlling the phase of the sample clock CKS2 used to open and close the sample switch 1, an echo canceller 24 for cancelling the echo component which has leaked from the transmitter side to the receiver side, a distributor circuit 25 responsive to a selection signal SELC for distributing an error signal e to the echo canceller 24 or the equalizer 2, a training sequencer 26 for controlling the distributor circuit, and an adder 18-3 for adding the echo canceller output to the output of the sample switch 1. Further, a framer 27 is connected to the output line of the transmission apparatus. The framer 27 adds a frame synchronization code to data (DATA1) supplied from a terminal or the like and transmits the result via a hybrid circuit while taking a frame as the unit.

The received signal supplied from the pair cable contains an echo component and an original received signal component. The echo canceller 24 receives the data DATA1 to be transmitted and calculates a signal for cancelling the leaking echo component by using a technique of deriving correlation between the data DATA1 and the error signal e obtained via the distributor circuit 25. As the error signal e, the output a of the equalizer 2 containing an echo cancel residue signal and intersymbol interference is used. In the adder 18-3, the output of the echo canceller 24 is added to the output of the sample switch 1. The echo component which has leaked into the receiver side is thus removed.

By the equalizer 2 so designed as to have frequency characteristics cancelling the frequency characteristics of the pair cable 9, the received signal with the echo component removed is compensated in gain and delay, and the intersymbol interference component is removed.

The received signal with intersymbol interference removed undergoes processing similar to that of the embodiment shown in FIG. 1. The processing will hereafter be described briefly.

First of all, the received signal with intersymbol interference removed undergoes in the discriminator 3 conversion from a line code to a binary signal. The discriminator 3 comprises a plurality of comparators respectively having predetermined thresholds. In case the 2B1Q code is to be discriminated, for example, three thresholds are provided. In case the 4B3T code is to be discriminated, two thresholds are provided.

In the deframer 4, the output X of the discriminator 3 is divided into the frame synchronization pattern and received data in accordance with the predetermined frame structure. The position of the frame synchronization pattern is indicated by the frame synchronization pattern position signal CKF2 outputted from the frame synchronization detector circuit 6.

The frame synchronization detector circuit 6 detects the coincidence between the output X of the discriminator 3 and a predetermined frame synchronization pattern and outputs the frame synchronization signal FSYNC and the frame synchronization pattern position signal CKF2.

On the basis of the output a of the equalizer 2 and the output X of the discriminator 3, the phase detector circuit 5 derives the phase difference between the phase of the current sample clock and the optimum sample phase of the received waveform. In response to the output UP/DOWN of the above described phase detector circuit 5, the clock controller circuit 7 changes the frequency division ratio of a system clock CK1 and thus controls the phase relation between the system clock CK1 and the sample clock CKS2. On the basis of the frame synchronization signal FSYNC of the frame detector circuit 6, the clock controller circuit 7 forcibly controls the phase of the sample clock in the quasi-convergence state.

If two variable circuits, i.e., the echo canceller 24 and the equalizer 2 simultaneously perform convergence operation, they compete each other and the overall system becomes unstable in some cases. Therefore, the distributor circuit 25 supplies the error signal e to only one of them. Control of the distributor circuit 25 is not especially specified, but it is performed by a predetermined training sequencer 26. The training sequencer 26 comprises a storage device such as ROM and a timer. The training sequencer generates the selection signal SELC so as to supply the error signal e to the echo canceller in the former half of the initial convergence and supply the error signal e to the equalizer 2 in the latter half of the initial convergence. After the initial convergence has been finished, the error signal e is supplied to the echo canceller 24 and the equalizer 2. In the example shown in the present embodiment, the output a of the equalizer is used as the error signal. However, the error signal is not limited to this. There is no problem so long as the signal contains the echo cancel residue component and intersymbol interference component. For example, a signal obtained by subtracting a received signal component estimated on the basis of the output X of the discriminator from the output a of the equalizer may be used.

Figure 12:
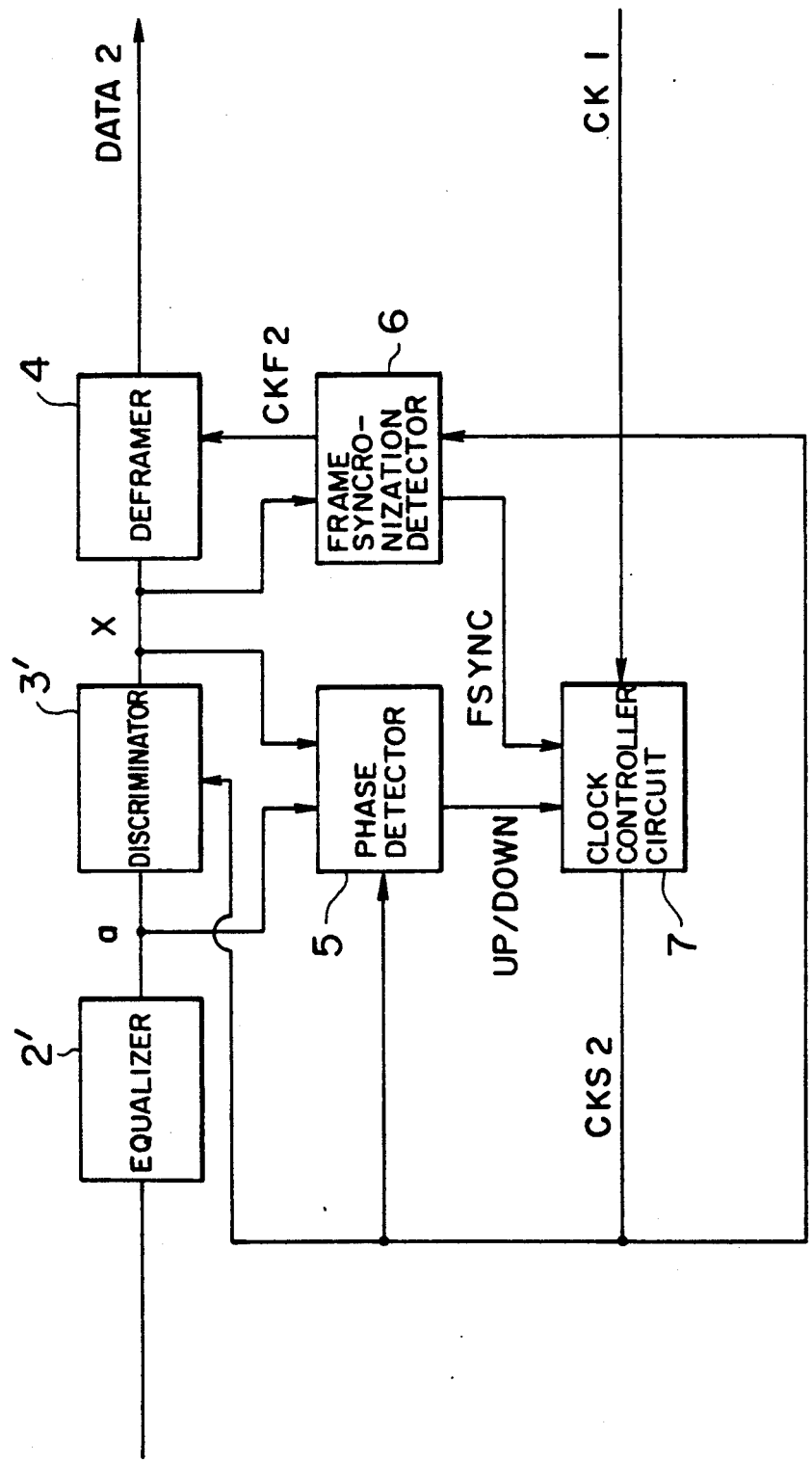
FIG. 12 is a block configuration diagram of a transmission apparatus in which the received signal is sampled by operation timing of a discriminator.

In the first and second embodiments (respectively shown in FIGS. 1 and 6), the sample switch 1 is disposed in a stage preceding the equalizer 2. In case the equalizer 2 is implemented in a continuous time sample system, however, an equivalent function can be attained by operation timing of the discriminator as well. As for the first embodiment, FIG. 12 shows its configuration diagram.

The second embodiment can also be configured so that the sample signal (CKS2) from the clock controller circuit 7 may be supplied to the discriminator 3 and operation of the discriminator 3 may be controlled on the basis of CKS2.

Figure 11:
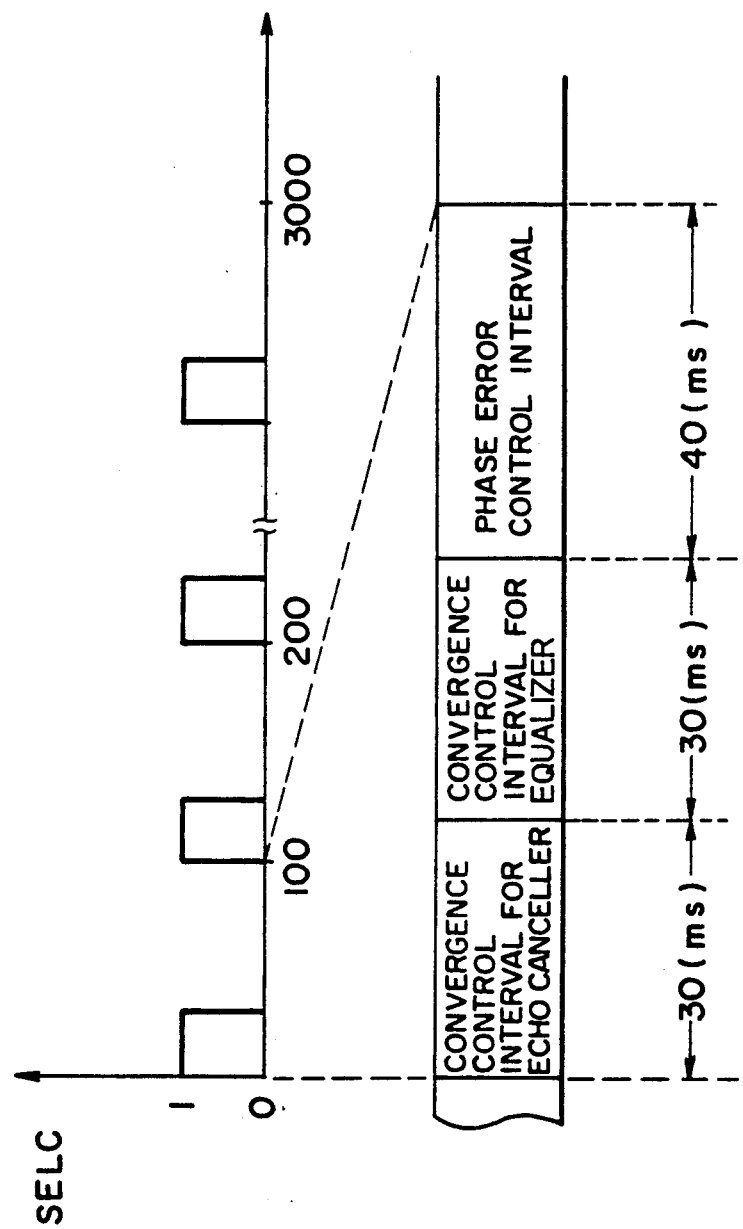
FIG. 11 is a diagram for explaining the relation between operation timing of convergence of an echo canceller and a selection signal (SELC)

FIG. 11 shows the relation of operation timing of convergence of the echo canceller, convergence of the equalizer and phase control with respect to the selection signal (SELC) supplied from the training sequencer 26.

When the signal SELC is "1", the error signal e is supplied to the echo canceller 24. When the signal SELC is "0", the error signal e is supplied to the equalizer 2.

In a first time interval (0-30 msec), the relation SELC=1 is satisfied and convergence of the echo canceller 24 is performed. In a second time interval (30-60 msec), the relation SELC=0 is satisfied and convergence of the equalizer 2 is performed. Finally in a third time interval (60-100 msec), the relation SELC=0 is maintained and phase control is performed according to the above described UP/DOWN signal.

The convergence control interval (repetition) largely changes according to characteristics of the transmission path and respective constituent circuits. In an actual circuit, however, complete convergence control is not attained by exercising control of the first to third time intervals only once. As illustrated, therefore, control operation in the above described first to third time intervals is repetitively conducted. In case of the present embodiment, 30 to 90 periods (i.e., 3 to 9 sec) are used as these control intervals. Thereafter, actual communication data are entered into an information field ($X_5$ to $X_{120}$) of a transmission frame, and mutual communication is performed. At this time, the distributor circuit 25 functions to supply the error system to both the echo canceller and the equalizer 2. Further, if filter coefficients of the echo canceller 24 and the equalizer 2 largely change in the communication interval, the circuit characteristics diverge. In this interval, therefore, predetermined restriction is imposed upon the control width of each filter coefficient.

In the first embodiment, an echo canceller is not included and hence its control is not required. FIG. 7B shows the configuration of the transmission frame of this case. In the first time interval (0 to 30 msec), convergence control of the equalizer 2 is exercised. In the second time interval (30 to 70 msec), phase error control is exercised. These first and second time intervals are repeated.

The present embodiment is so illustrated as to comprise independent function blocks. The present invention is not limited to this. Respective functions may be implemented in a time-division manner. For example, there is no problem even if these functions are implemented by program given to a signal processor.

Even if the sampling phase of the received signal is fixed to a quasi-stable point because of nonconvergence of the equalizer, for example, the present invention makes it possible to detect the state and forcibly change the sample phase of the received signal to escape from the quasi-stable point.

This function makes it possible to shorten the time required for initial convergence and eliminate the problem of failure of convergence due to nonconvergence.

What we claim is:

1. In a transmission apparatus for extracting transmission data from a received signal inputted through a transmission path every transmission frame including a predetermined synchronization code train and transmission data, a transmission system comprising:

(a) switch means for sampling said received signal in accordance with a sampling signal;

(b) level discrimination means for discriminating an amplitude level of the sampled received signal;

(c) phase detector means responsive to the sampled received signal and the output signal of said level discrimination means for detecting a sample phase error in said received signal and responsive to the amount of sample phase error detected during a predetermined interval for generating and outputting a phase control signal;

(d) synchronization detector means responsive to a frame signal generated from said sampling signal for outputting a synchronization discrimination signal representing the presence or absence of frame synchronization on the basis of an output signal train of said level discriminator means and a predetermined code train; and (e) sample signal synchronization controller means responsive to said phase control signal and said synchronization discrimination signal for controlling the period of said sampling signal.

2. In a transmission apparatus for extracting transmission data from a received signal inputted via a transmission path every transmission frame including a predetermined synchronization code train and transmission data, a transmission system comprising:

discriminator means responsive to a sampling signal for discriminating an amplitude level of said received signal;

phase detector means responsive to said received signal and the output signal of said discriminator means for detecting a sample phase error in said received signal and responsive to the amount of sample phase error detected during a predetermined interval for generating and outputting a phase control signal;

synchronization detector means responsive to a frame signal generated from said sampling signal for generating a synchronization discrimination signal representing the presence or absence of frame synchronization on the basis of the output signal train of said discriminator means and a predetermined code train; and sampling signal period controller means responsive to said phase control signal and said synchronization discrimination signal for controlling the period of said sampling signal.

3. A transmission system according to claim 2, wherein said sampling signal period controller means comprises variable frequency divider means for generating said sampling signal by applying frequency division to a reference signal having a predetermined frequency with a frequency division ratio, and a first frequency division ratio for applying frequency division to said reference signal generated by using the level value of said phase control signal and a second frequency division ratio for escaping from quasi-convergence of sample phase are selectively switched according to said synchronization signal and said phase control signal and are supplied to said variable frequency divider means.

4. In a transmission apparatus connected to a transmission path via a hybyrd circuit to communicate transmission data to each other between the transmitting side and receiving side for each transmission frame having a predetermined synchronization code train and a transmission data train, said hybrid circuit outputting a transmission frame received from a transmission path onto an input line and outputting a transmission frame transmitted from an output line onto said transmission path, a transmission system comprising:
(a) switch means responsive to a sampling signal for sampling a received signal inputted via said input line;
(b) first means for removing an echo component caused by impedance mismatching between said hybrid circuit and said transmission path from said sampled received signal;
(c) second means for removing an intersymbol interference component caused by frequency characteristics of said transmission path from the output of said first means;
(d) discriminator means for discriminating an amplitude level of the output of said second means;
(e) phase detector means for generating and outputting a phase control signal by using the output of said second means and the output of said discriminator means;
(f) synchronization detector means responsive to a transmission frame signal generated from said sampling signal for generating a synchronization discrimination signal representing presence or absence of frame synchronization on the basis of the result of comparison between the output signal train of said discriminator means and a predetermined code train; and
sampling signal period controller means responsive to said phase control signal and said synchronization discrimination signal for controlling the period of said sampling signal.

5. In a transmission apparatus connected to a transmission path via a hybrid circuit to communicate transmission data to each other between the transmitting side and receiving side for each transmission frame having a predetermined synchronization code train and a transmission data train, said hybrid circuit outputting a transmission frame received from a transmission path onto an input line and outputting a transmission frame transmitted from an output line onto said transmission path, a transmission system comprising:
first means for removing an echo component caused by impedance mismatching between said hybrid circuit and said transmission path from a received signal inputted via said transmission path;
second means for removing an intersymbol interference component caused by frequency characteristics of said transmission path from the output of said first means;
discriminator means responsive to a sampling signal for discriminating an amplitude level of the output of said second means;
phase detector means for outputting a phase control signal by using the output of said second means and the output of said discriminator means;
synchronization detector means responsive to a frame signal generated from said sample signal for generating a synchronization discrimination signal representing presence or absence of frame synchronization on the basis of the result of comparison between the output signal train of said discriminator means and a predetermined code train; and
sampling signal period controller means responsive to said phase control signal and said synchronization discrimination signal for controlling the period of said sampling signal.

6. A transmission system according to claim 5, wherein said transmission system further comprises:
controller means for controlling coefficients used by said first means by using the output of said first means in a first interval and for controlling coefficients used by said second means by using the output of said second means in a second interval.

7. A transmission system according to claim 5, wherein said sampling signal period controller means comprises:
variable frequency divider means for generating said sampling signal by applying frequency division to a reference signal having a predetermined frequency with a desired frequency division ration, and a first frequency division ratio generated by using the level value of said phase control signal and a second frequency division ratio for escaping from quasi-convergence of sample phase are selectively switched according to said synchronization signal and said phase control signal and are supplied to said variable frequency divider means.

8. A transmission system in which a transmission apparatus connected to a transmission path communicates with another transmission apparatus by using a transmission frame having a predetermined synchronizing signal train and transmission data, said transmission apparatus comprising:
switch means responsive to a sampling signal for sampling a received signal inputted via a transmission path;
discriminator means for discriminating an amplitude level of the received signal thus sampled;
phase detector means responsive to the sampled received signal and the output signal of said discriminator means for detecting a sample phase error in said received signal and responsive to the amount of sample phase error detected during a predetermined interval for outputting a phase control signal;
synchronization detector means responsive to a frame signal generated from said sampling signal for generating a synchronization discrimination signal representing the presence or absence of frame synchronization on the basis of the output signal train of said discriminator means and a predetermined code train; and
sampling signal period controller means responsive to said phase control signal and said synchronization discrimination signal for controlling the period of said sampling signal.

9. A transmission system in which a transmission apparatus connected to a transmission path communicates with another transmission apparatus by using a transmission frame including a predetermined synchronizing signal train and transmission data, said transmission apparatus comprising:
discriminator means responsive to a sampling signal for discriminating the amplitude level of a received signal inputted via a transmission path;
phase detector means responsive to said received signal and the output signal of said discriminator means for detecting a sample phase error in said received signal and responsive to the amount of sample phase error detected during a predetermined interval for generating a phase control signal;
synchronization detector means responsive to a frame signal generated from said sampling signal for generating a synchronization discrimination signal representing the presence or absence of frame synchronization on the basis of the output signal train of said discriminator means and a predetermined code train; and sampling signal period controller means responsive to said phase control signal and said synchronization discrimination signal for controlling the period of said sampling signal.

10. A transmission system according to claim 9, wherein said sampling signal period controller means comprises variable frequency divider means for generating said sampling signal by applying frequency division to a reference signal having a predetermined frequency with an arbitrary frequency division ratio, and a first frequency division ratio generated by using the level value of said phase control signal and a second frequency division ratio for escaping from quasi-convergence of sample phase are selectively switched according to said synchronization signal and said phase control signal and are supplied to said variable frequency divider means.

11. A transmission apparatus for extracting transmission data from a received signal inputted via a transmission path every transmission frame including a predetermined synchronization code train and transmission data, said transmission apparatus comprising:

phase detector means responsive to a sampling signal for discriminating an amplitude level of said received signal and responsive to the result of discrimination for detecting a sample phase error therein;

synchronization detector means responsive to a frame signal generated from said sampling signal for comparing the discrimination signal train of said received signal with a predetermined code train to discriminate the presence or absence of frame synchronization; and sampling signal period controller means responsive to the presence or absence of said sample phase error and the discrimination result of said synchronization detector means for controlling the period of sampling signal.

12. A transmission signal processing method for extracting transmission data from a received signal inputted to a transmission apparatus via a transmission path every transmission frame including a predetermined code train and transmission data, said transmission signal processing method comprising the steps of:

(a) discriminating the amplitude level of said received signal in response to a sampling signal and detecting a sampling phase error in the received signal in response to the result of discrimination;

(b) detecting the presence or absence of frame synchronization in a predetermined interval by comparing the discrimination signal train of said received signal with a predetermined reference code train in response to a frame signal generated from said sampling signal; and (c) controlling the period of said sampling signal on the basis of said detection result of sample phase error and said detection result of the presence or absence of said frame synchronization.

13. A transmission signal processing method according to claim 12, wherein said sample phase error detection step comprises the step of controlling the frequency of the sampling signal until the phase error detected from a received signal extracted in synchronism with a sampling signal becomes minimum.

14. A transmission signal processing method according to claim 13, wherein the detection step of said predetermined synchronization code train generates a quasi-convergence signal representing quasi-convergence of sampling phase of the received signal when said predetermined synchronization code train is not detected in a predetermined interval, and said sampling signal period control step changes the frequency of said sampling signal by a predetermined amount which is sufficient for escape from the quasi-convergence in response to said quasi-convergence signal, and wherein said sample phase error detection step and said predetermined synchronization code train detection step are thereafter repeated.

15. A transmission signal processing method according to claim 12, further comprising the steps of:

removing an echo component of transmission data from the sampled received signal; and removing an intersymbol interference component from said received signal with the echo component removed and supplying the received signal with the intersymbol interference thus removed to said sample phase error detection step.

16. A signal processing method in a transmission apparatus for extracting transmission data from a received signal inputted via a transmission path every transmission frame including a predetermined frame synchronization pattern and transmission data, said signal processing method comprising the steps of:

(a) detecting a phase error from a received signal extracted in synchronism with the sampling signal and controlling the frequency of said sampling signal until said phase error becomes minimum;

(b) detecting the presence or absence of the frame synchronization pattern of the received signal in a predetermined interval; and (c) changing the frequency of said sampling signal by a predetermined amount in response to absence of the frame synchronization pattern for a predetermined interval after the frequency control of said sampling signal, and repeating said steps (a) and (b).

* * * * *